(12) United States Patent
King et al.

(10) Patent No.: US 6,886,422 B2
(45) Date of Patent: May 3, 2005

(54) METHODS AND APPARATUS FOR INSPECTING COMPONENTS

(75) Inventors: Aaron Henry King, West Chester, OH (US); James Marion Vau, Los Lunas, NM (US); Brett Wayne Byrnes, Tijeras, NM (US)

(73) Assignee: General Electric Co., Schenectady, NY (US)

( * ) Notice: Subject to any disclaimer, the term of this patent is extended or adjusted under 35 U.S.C. 154(b) by 228 days.

(21) Appl. No.: 10/267,250

(22) Filed: Oct. 9, 2002

(65) Prior Publication Data

US 2004/0069077 A1 Apr. 15, 2004

(51) Int. Cl.⁷ .............................................. G01M 19/00
(52) U.S. Cl. .................................... 73/865.8; 73/119 R
(58) Field of Search ........................... 73/865.8, 119 R, 73/866.5

(56) References Cited

U.S. PATENT DOCUMENTS

| | | | |
|---|---|---|---|
| 3,457,484 A | * | 7/1969 | Hashimoto et al. .......... 318/578 |
| 3,727,119 A | * | 4/1973 | Stanley et al. ........... 318/568.25 |
| 4,071,820 A | | 1/1978 | Mushinsky |
| 4,437,213 A | | 3/1984 | Reese et al. |
| 4,665,625 A | * | 5/1987 | Ireland et al. ................ 33/530 |
| 4,946,587 A | | 8/1990 | Reeves et al. |
| 5,014,439 A | | 5/1991 | Butzin et al. |
| 5,513,539 A | | 5/1996 | McLaughlin et al. |
| 5,914,055 A | | 6/1999 | Roberts et al. |
| 6,179,567 B1 | | 1/2001 | Stauffer et al. |
| 6,337,479 B1 | * | 1/2002 | Kley ............................ 250/234 |
| 6,409,471 B1 | | 6/2002 | Stow |
| 6,467,339 B1 | | 10/2002 | Descoteaux et al. |

* cited by examiner

Primary Examiner—Hezron Williams
Assistant Examiner—Rodney Frank
(74) Attorney, Agent, or Firm—William Scott Andes; Armstrong Teasdale LLP

(57) ABSTRACT

A method for inspecting a component. The method includes coupling the component to a fixture such that the component is fixedly secured in position during machining of the component, and inspecting the component using an inspection tool while the component is coupled to the fixture.

8 Claims, 7 Drawing Sheets

US 6,886,422 B2

METHODS AND APPARATUS FOR INSPECTING COMPONENTS

BACKGROUND OF THE INVENTION

This invention relates generally to inspection techniques, and more specifically to methods and apparatus for inspecting components.

Accurately measuring a surface of a component may be a significant factor in determining a manufacturing time of the component, as well in determining subsequent maintenance and repair costs and activities. Specifically, when the component is a gas turbine engine shroud, accurately measuring the contour of the shroud may be one of the most significant factors affecting an overall cost of fabrication of the gas turbine engine, as well as subsequent modifications, repairs, and inspections of the blade airfoils. For example, at least some known gas turbine engine shroud segments are small and include a snubber section and a racetrack section. For performance reasons, both the snubber section and the racetrack section require an accurately machined thickness. However, accurately measuring the thickness of the snubber and racetrack sections may be difficult because of the relative small size of the shroud segment.

At least some known inspection processes use coordinate measuring machines (CMMS) or other gages to obtain dimensional information for a shroud segment. Within at least some CMMs and gages, the thickness of a section of a shroud segment is determined by measuring a drop from a surface of the shroud segment to a surface whose location is known, such as a fixture used with the CMM or other gage. However, determining the thickness of a section of a shroud segment by measuring the drop to a known surface does not directly measure the thickness of the shroud segment, and therefore may be inaccurate. Furthermore, at least some known shroud segments must be removed from the machining apparatus prior to being inspected by a CMM or other gage. Removing the shroud segment from a machining apparatus increases the number of fabrication operations and the number of apparatuses used for manufacturing, thus increasing manufacturing time and cost. In addition, if the shroud segment fails the inspection, the segment may then need to be reinstalled in the machining apparatus for further machining. However, because of the size and contour of the shroud segment, it may be difficult to reinstall the shroud segment within the machining apparatus in the same relative position with respect to the original machining, thereby increasing error and manufacturing time.

BRIEF DESCRIPTION OF THE INVENTION

In one aspect, a method is provided for inspecting a component. The method includes coupling the component to a fixture such that the component is fixedly secured in position during machining of the component, and inspecting the component using an inspection tool while the component is coupled to the fixture.

In another aspect, an inspection tool is provided. The tool includes a first probe having a probe body, a first probe tip coupled to the probe body, and a second probe tip coupled to the probe body. The first probe is configured to inspect a component using the first and second probe tips.

In yet another aspect, an inspection apparatus is provided for inspecting a component. The inspection apparatus includes a machining apparatus configured to machine the component, a fixture coupled to the machining apparatus and configured to couple to the component such that the component is fixedly secured in position during machining of the component, and an inspection tool coupled to at least one of the fixture and the machining apparatus. The inspection tool is configured to inspect the component while the component is coupled to the fixture.

DETAILED DESCRIPTION OF THE INVENTION

As used herein, the terms "inspection" and "inspecting" may include any inspection process. For example, inspection processes may include measurement by a machine, measurement by humans, visual inspection by a machine, and/or visual inspection by a human. The above examples are intended as exemplary only, and thus are not intended to limit in any way the definition and/or meaning of the terms "inspection" and "inspecting". Also, as used herein the terms "manufacture" and "manufacturing" may include any manufacturing process. For example, manufacturing processes may include machining, inspecting, and/or casting. The above examples are intended as exemplary only, and thus are not intended to limit in any way the definition and/or meaning of the terms "manufacture" and "manufacturing".

As used herein the term "component" may include any object to which an inspection or manufacturing process is applied. Furthermore, as used herein the terms "machining" and "machined" may include any process used for shaping a component. For example, processes used for shaping a component may include turning, planing, milling, grinding, finishing, polishing, and/or cutting. In addition, and for example, shaping processes may include processes performed by a machine, a machine tool, and/or a human being. The above examples are intended as exemplary only, and thus are not intended to limit in any way the definition and/or meaning of the terms "machining" and "machined". In addition, as used herein the term "machining apparatus" may include any device used to machine a component. For example, any device used to machine a component may include a machine, a human, and/or a machine tool. The above examples are intended as exemplary only, and thus are not intended to limit in any way the definition and/or meaning of the term "machining apparatus".

Although the invention is described herein in association with a gas turbine engine, and more specifically for use with a shroud segment for a gas turbine engine, it should be understood that the present invention may be applicable to any component and/or any inspection process. Accordingly, practice of the present invention is not limited to the inspection of shrouds or other components of gas turbine engines.

Figure 1:
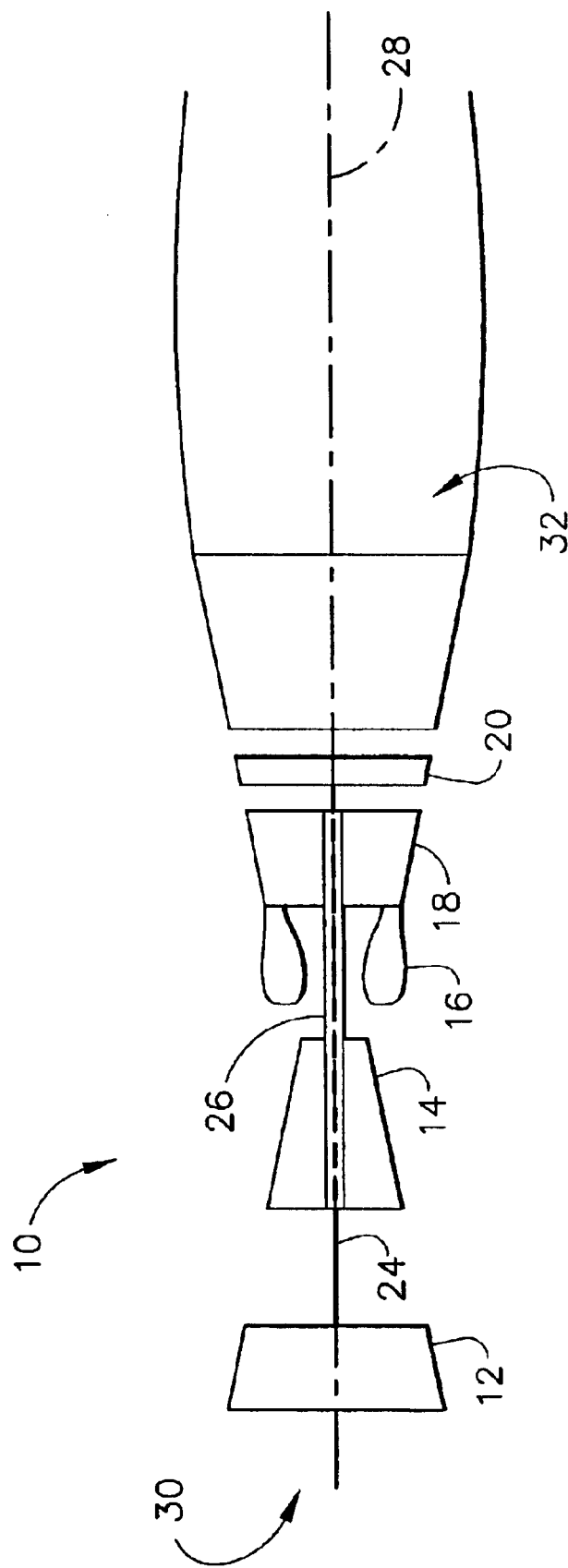
FIG. 1 is a schematic illustration of an exemplary gas turbine engine.

FIG. 1 is a schematic illustration of an exemplary gas turbine engine 10 including a low pressure compressor 12, a high pressure compressor 14, and a combustor assembly 16. Engine 10 also includes a high pressure turbine 18 and a low pressure turbine 20. Compressor 12 and low pressure turbine 20 are coupled by a first shaft 24, and compressor 14 and high pressure turbine 18 are coupled by a second shaft 26. Engine 10 includes an axis of symmetry 28 extending from an inlet side 30 of engine 10 aftward to an exhaust side 32 of engine 10. Shafts 24 and 26 rotate about axis of symmetry 28. In one embodiment, engine 10 is a GE90 engine available from General Electric Aircraft Engines, Cincinnati, Ohio. In operation, air flows through low pressure compressor 12 from inlet side 30 of engine 10 and compressed air is supplied from low pressure compressor 12 to high pressure compressor 14. Highly compressed air is then delivered to combustor assembly 16 where it is mixed with fuel and ignited. The combustion gases are channeled from combustor 16 and used to drive turbines 18 and 20.

Figure 2:
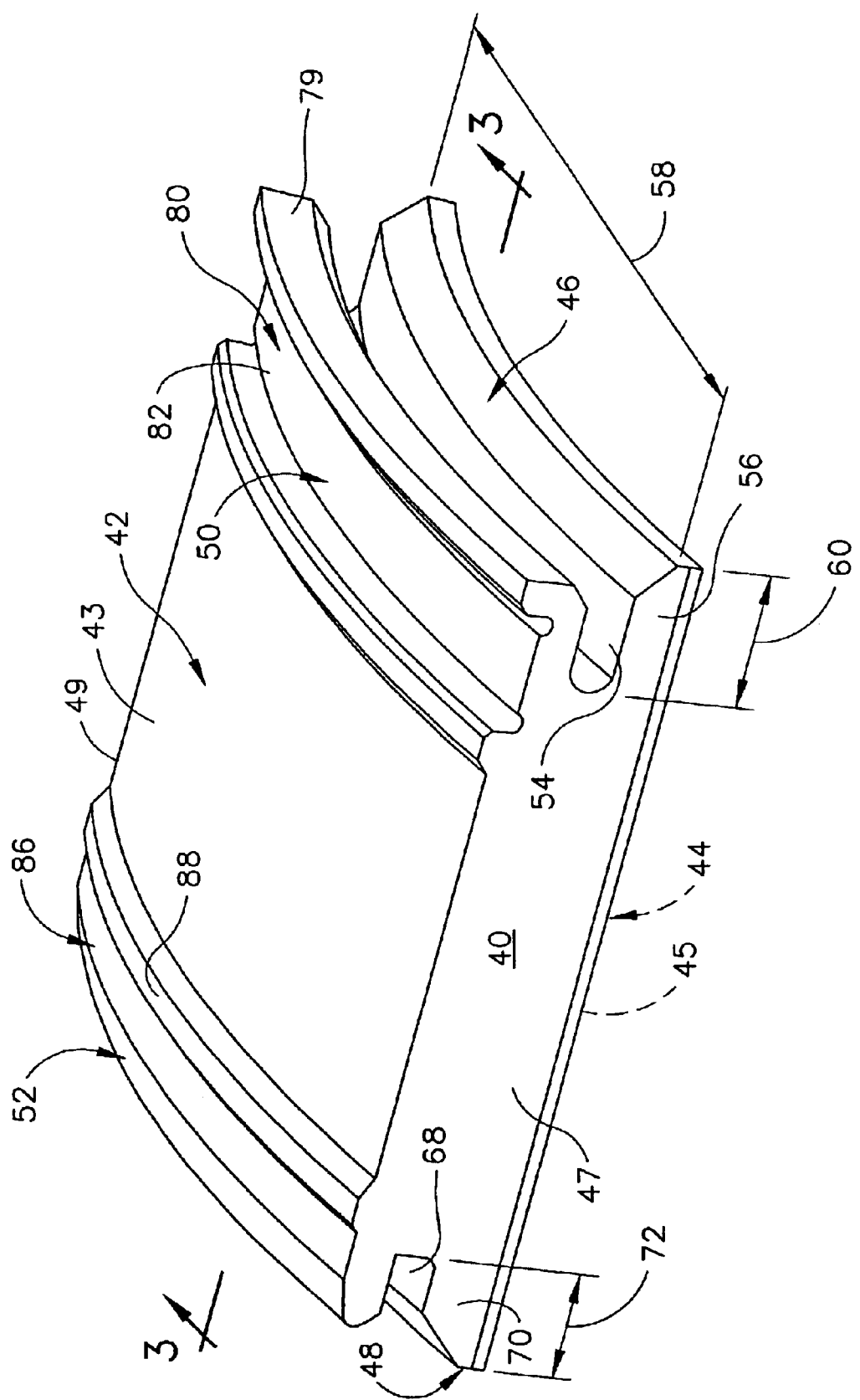
FIG. 2 is a perspective view of an exemplary gas turbine engine shroud segment included in the gas turbine engine shown in FIG. 1.
Figure 3:
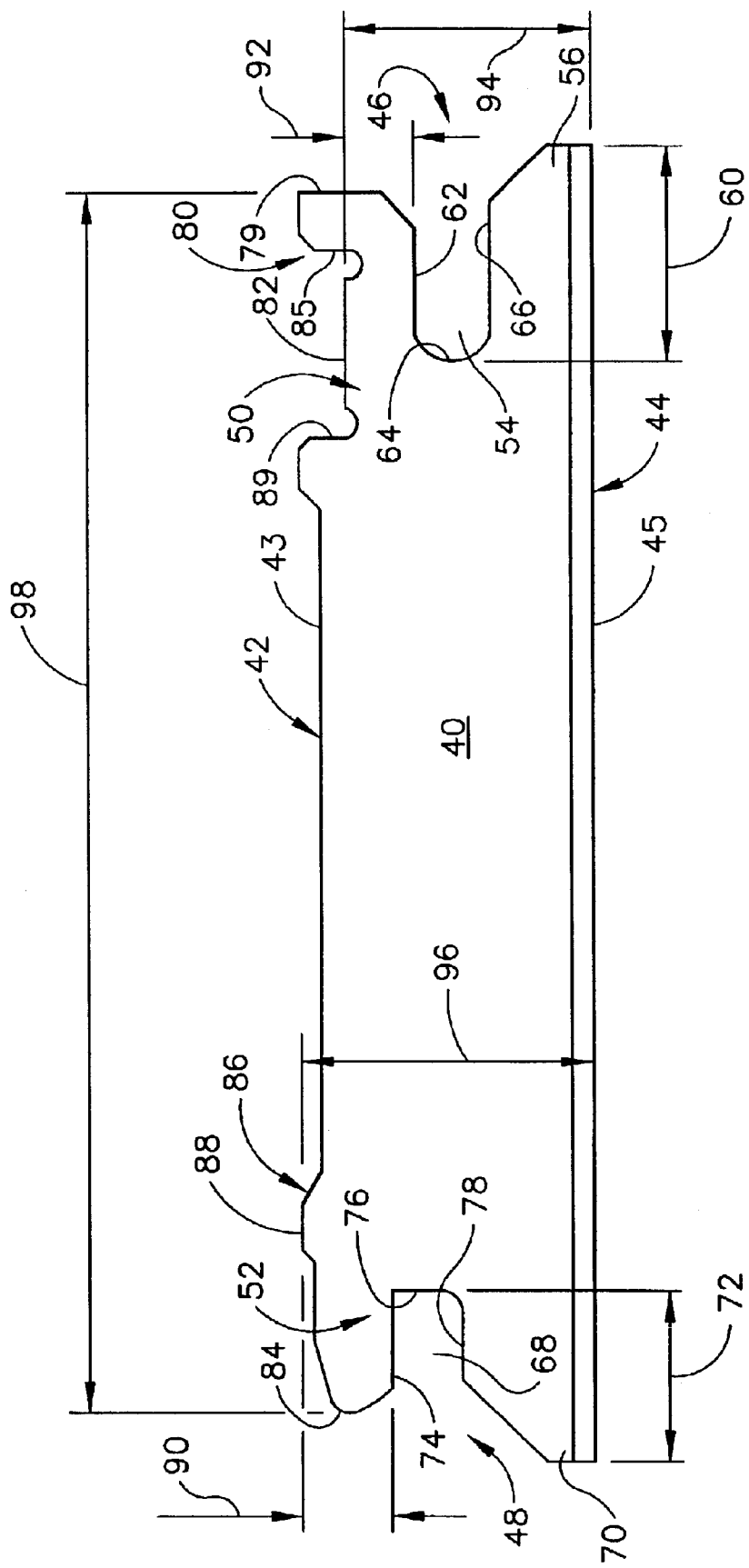
FIG. 3 is a cross-sectional view of the gas turbine engine shroud segment shown in FIG. 2 and taken along line 3—3 of FIG. 2.

FIG. 2 is perspective view of a portion of high pressure turbine 18 including an exemplary gas turbine engine shroud segment 40. FIG. 3 is a cross-sectional view of shroud segment 40 taken along line 3—3 of FIG. 2. Turbine 18 includes an outer casing (not shown) that circumferentially surrounds a stator assembly (not shown), a rotor assembly (not shown), and a turbine nozzle assembly (not shown). In one embodiment, a plurality of shroud segments 40 are disposed: radially inward from the outer casing and extend circumferentially around the turbine nozzle assembly such that adjacent shroud segments 40 circumferentially contact to form a static ring shroud (not shown). Shroud segment 40 has an arcuate cross-sectional profile, and includes a radially outer side 42 and a radially inner side 44. Shroud segment 40 also includes a radially outer surface 43 and a radially inner surface 45. Surfaces 43 and 45 are connected by a first side 46, a front 47, a second side 48, a back 49, a racetrack section 50, and a snubber section 52. More specifically, radially inner side 44 and radially outer side 42 extend between first side 46 and second side 48. In the exemplary embodiment, radially inner side 44 is generally concentric with radially outer side 42 along a width 58 of segment 40. In addition, in the exemplary embodiment, radially inner side 44 is generally parallel with radially outer side 42 along a first shroud segment length 98 of segment 40.

In the exemplary embodiment, first side 46 includes a first passageway 54 defined between racetrack section 50 and a first side projection 56 of segment 40. First passageway 54 extends along width 58 of segment 40 from segment front 47 to segment back 49, and extends a depth 60 inwardly from first side 46 towards segment second side 48. First passageway 54 includes a radially outer wall 62, a side wall 64, and a radially inner wall 66. In the exemplary embodiment, side wall 64 is substantially semi-cylindrical. Second side 48 includes a second passageway 68 defined between snubber section 52 and a second side projection 70. Second passageway 68 extends along width 58 of shroud segment 40 from segment front 47 to segment back 49, and extends a depth 72 inwardly from second side 48 towards first side 46. Second passageway 68 includes a radially outer wall 74, a side wall 76, and a radially inner wall 78.

Racetrack section 50 includes a side surface 79 and a groove 80 defined in radially outer side 42 and extending along segment width 58. Racetrack side surface 79 is illustrated in FIGS. 2 and 3 as a machined surface. Groove 80 includes a bottom 82, a first side 84, and a second side 86. Snubber section 52 includes a projection 86 extending radially outwardly from radially outer side 42 and radially outer surface 43. Projection 86 extends along segment width 58, and includes a projection surface 88 that extends outwardly from radially outer surface 43. Snubber section 52 further includes a side surface 89.

First passageway 54, second passageway 68, radially inner surface 45, groove 80, projection surface 88, racetrack side surface 79, and snubber side surface 89 are configured to be machined using a machining apparatus. A distance 90 between the machined surfaces of projection surface 88 and outer wall 74 of second passageway 68 defines a snubber thickness 90. In addition, a distance 92 between the machined surfaces of groove bottom 82 and first passageway outer wall 62 defines a racetrack thickness 92. A distance 94 between the machined surfaces of radially inner surface 45 and groove bottom 82 defines a first shroud segment thickness 94. Also, a distance 96 between the machined surfaces of radially inner surface 45 and projection surface 88 defines a second shroud segment thickness 96. Furthermore, a distance 98 between the machined surfaces of snubber side surface 89 and racetrack side surface 79 defines a first shroud segment length 98, and a distance (not shown) between snubber side surface 89 and racetrack side surface 79 before racetrack side surface 79 has been machined defines a second shroud segment length (not shown).

Figure 4:
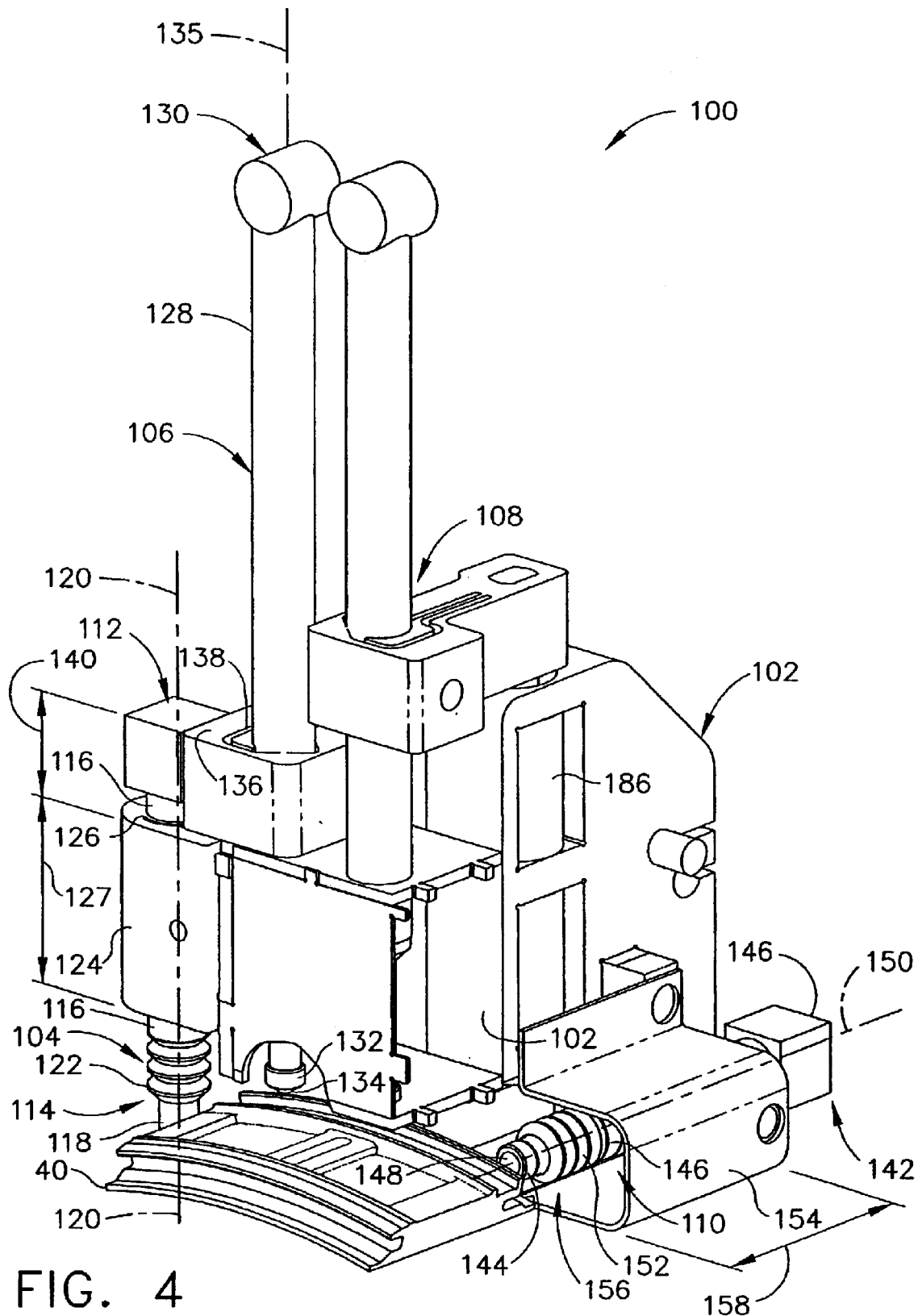
FIG. 4 is a perspective view of an inspection tool assembly for inspecting a component, such as the gas turbine engine shroud segment shown in FIGS. 2 and 3.
Figure 5:
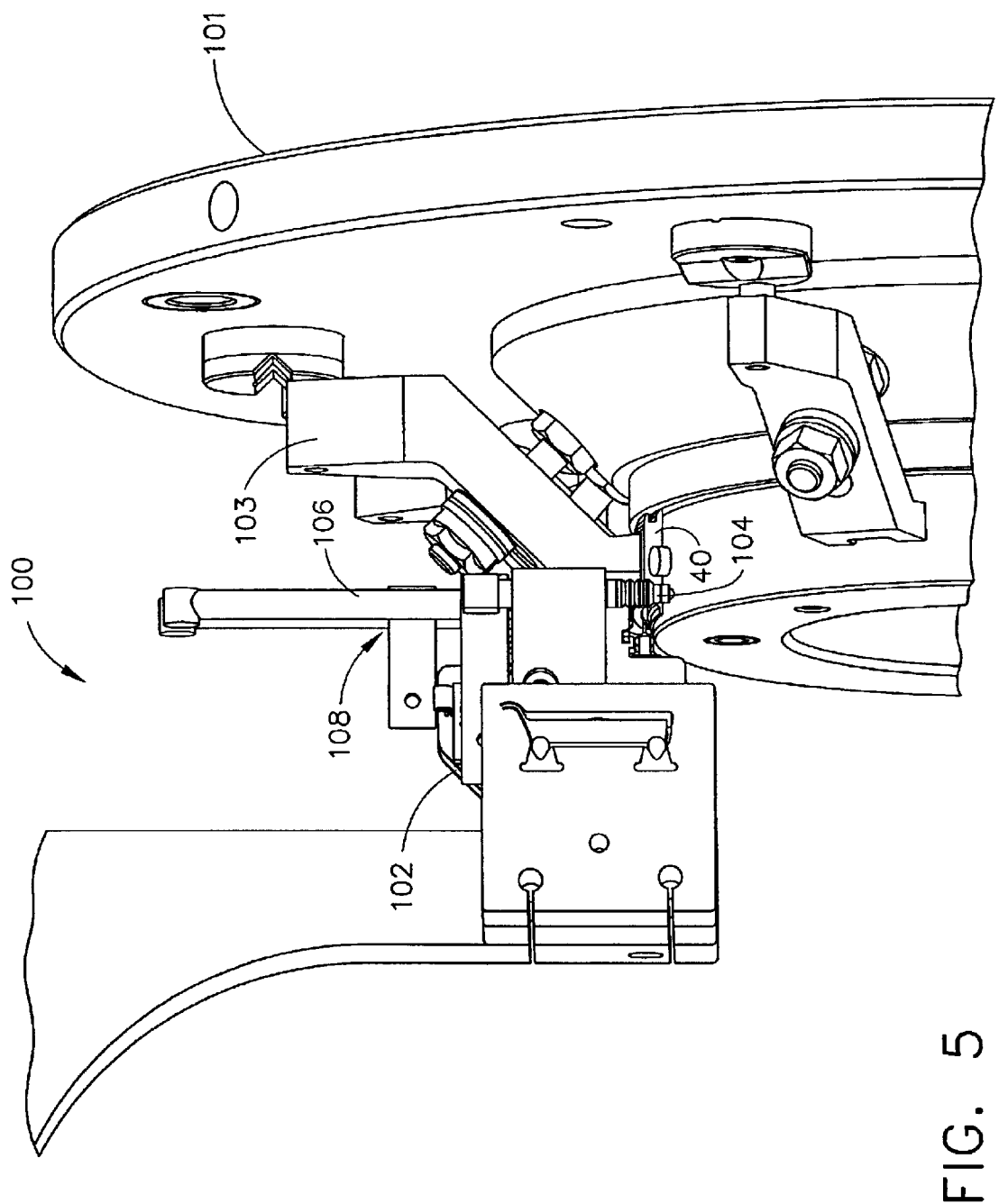
FIG. 5 is a perspective view of the inspection tool assembly shown in FIG. 4 and including a fixture used for fixedly securing a component, such as the gas turbine engine shroud segment shown in FIGS. 2 and 3.
Figure 6:
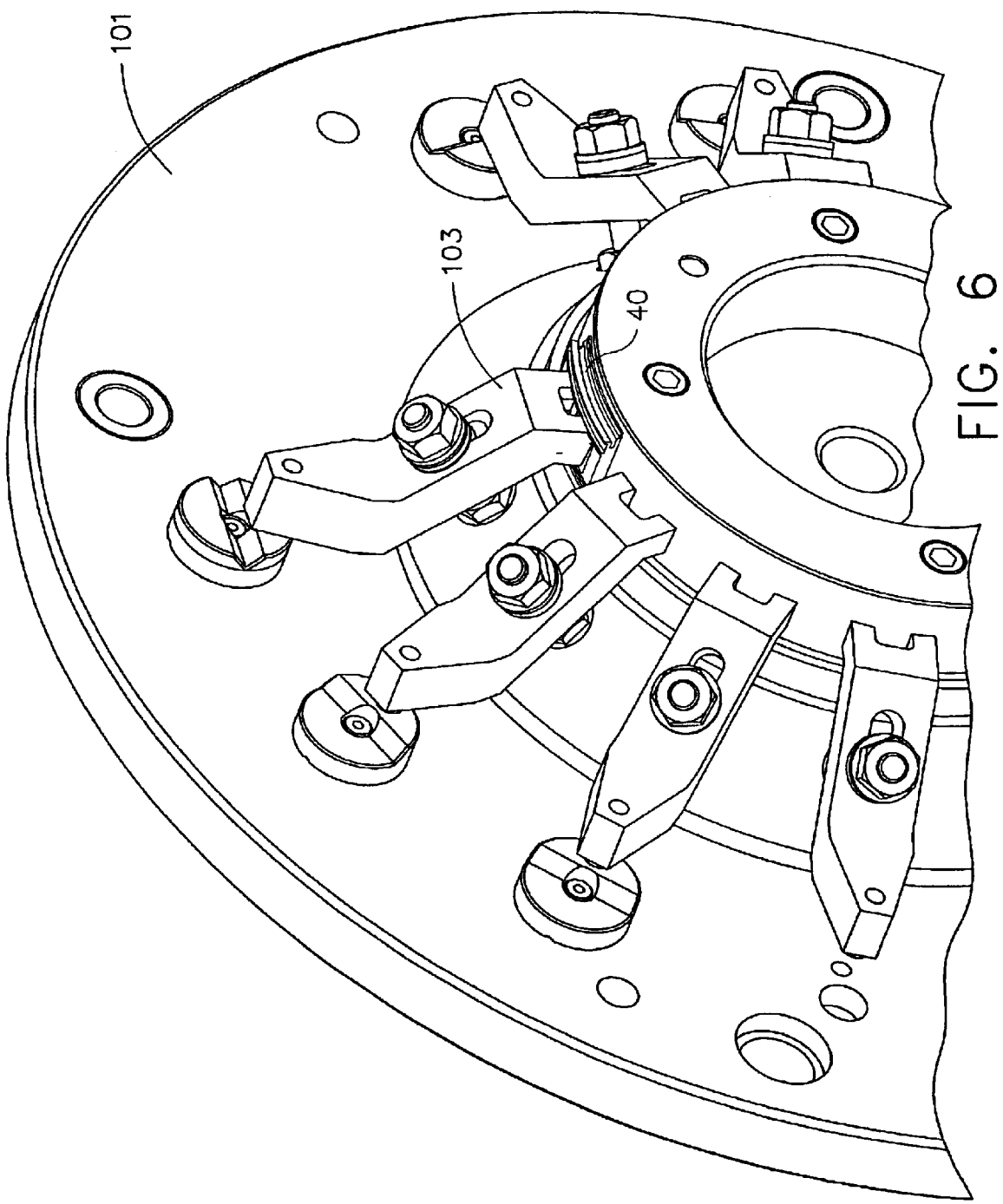
FIG. 6 is a perspective view of the fixture shown in FIG. 5 illustrating the shroud segment shown in FIGS. 2 and 3 fixedly secured thereto.

FIG. 4 is a perspective view of an inspection tool assembly 100 used for inspecting shroud segment 40. FIG. 5 is a perspective view of inspection tool assembly 100 including a fixture 101 used for fixedly securing shroud segment 40. FIG. 6 is a perspective view of fixture 101 illustrating shroud segment 40 fixedly secured thereto. Prior to machining, shroud segment 40 is coupled to fixture 101 and fixture 101 fixedly secures shroud segment 40 with respect to fixture 101 and in a position to facilitate accurate machining of shroud segment 40 by a machining apparatus (not shown). Fixture 101 retains segment 40 during machining with respect to fixture 101 and in position to facilitate accurate machining of shroud segment 40. In the exemplary embodiment, fixture 101 fixedly secures shroud segment 40 with respect to fixture 101 using a clamp 103. However, it will be understood that fixture 101 may fixedly secure shroud segment 40 with respect to fixture 101 using any suitable means. In one embodiment (not shown), fixture 101 is coupled to the machining apparatus, using any suitable means. In an alternative embodiment (not shown), fixture 101 is not coupled to the machining apparatus but rather fixedly secures shroud segment 40 in a position with respect to the machining apparatus and fixture 101 to facilitate accurate machining of segment 40 using the machining apparatus.

Inspection tool assembly 100 is used to inspect fixture 101, and to determine snubber thickness 90, racetrack thickness 92, first shroud segment thickness 94, second shroud segment thickness 96, first shroud segment length 98, and the second shroud segment length while shroud segment 40 is coupled to fixture 101 in position to facilitate accurate machining of segment 40.

In one embodiment, inspection tool assembly 100 is coupled to the machining apparatus, using any suitable means. For example, in one embodiment inspection tool assembly 100 is coupled to the machining apparatus using threaded bolts and threaded openings. Inspection tool assembly includes fixture 101, an inspection tool body 102, a fixture probe 104, a segment thickness probe 106, a snubber and racetrack probe 108, and a segment length probe 110. Probes 104, 106, 108, and 110 are coupled to body 102, using any suitable means. For example, in one embodiment, at least one of probes 104, 106, 108, and 110 is coupled to body 102 using threaded bolts and threaded nuts. In another embodiment, at least one of probes 104, 106, 108, and 110 is coupled to body 102 using threaded bolts and threaded openings.

Fixture probe 104 is configured to inspect fixture 101 and includes a first end 112, a second end 114, a probe body 116, a probe tip 118, a fixture probe axis 120, a biasing mechanism 122, and a connecting member 124. Connecting member 124 is coupled to inspection tool assembly body 102 and probe body 116 is received within an opening 126 that extends through a length 127 of connecting member 124. Biasing mechanism 122 is coupled to probe body 116 and probe tip 118, and biases probe tip 118 away from connecting member 124 along axis 120. When fixture 101 is in a position with respect to inspection tool assembly 100 to facilitate inspection of fixture 101, biasing mechanism 122 biases probe tip 118 to contact a surface (not shown) of fixture 101. In one embodiment, biasing mechanism 122 is a spring. However, it should be understood that biasing mechanism 122 may be any biasing mechanism suitable for biasing probe tip 118 to contact a surface of fixture 101. Using probe tip 118, fixture probe 104 measures a location of the surface of fixture 101. Determining the location of the surface of fixture 101 allows the thermal growth of fixture 101 and machine apparatus error to be measured throughout a manufacturing cycle, and enables offsets of the machining apparatus to be corrected.

Segment thickness probe 106 is configured to inspect first shroud segment thickness 94 and second shroud thickness 96. Segment thickness probe 106 includes a probe body 128 having a first end 130 and a second end 132, a segment thickness probe axis 135, and a connecting member 136. Probe body 128 includes a probe tip 134 extending outwardly from second end 132. Connecting member 136 is coupled to inspection tool assembly 100 and includes an opening 138 that extends through a length 140 of connecting member 136. A portion of probe body 128 is received within opening 138 and probe body 128 is fixedly secured within opening 138 using any suitable means, for example threaded bolts and threaded nuts. In an alternative embodiment, probe body 128 is moveable within opening 138 such that probe body 128 is translatable and selectively positionable along axis 135 within opening 138. Probe tip 134 is moveable along axis 135 and within probe body 128. More specifically, probe tip 134 is translatable and selectively positionable along axis 135 within probe body 128. In addition, probe body 128 is moveable along axis 135 and with respect to inspection tool assembly body 102 such that probe body 128 is translatable and selectively positionable along axis 135. Movement of probe tip 134 and probe body 128 along axis 135 is driven by any suitable mechanism or means, such as, but not limited to, a pneumatic system or a biasing mechanism.

When shroud segment 40 and fixture 101 are in a position with respect to inspection tool assembly 100 to facilitate inspection of at least one of shroud segment thickness 94 and second shroud thickness 96, probe tip 134 moves along axis 135 from a position wherein probe tip 134 does not contact racetrack section groove bottom 82 or snubber section projection surface 88 to a position wherein probe tip 134 contacts either groove bottom 82 or projection surface 88. Segment thickness probe 106 is then used to measure the location of probe tip 134 and compares the location of probe tip 134 with the location of the surface of fixture 101 measured by fixture probe 104 to determine either first shroud segment thickness 94 or second shroud segment thickness 96.

Segment length probe 110 is configured to inspect first shroud segment length 98 and the second shroud segment length. Probe 110 includes a first end 142, a second end 144, a probe body 146, a probe tip 148, a segment length probe axis 150, a biasing mechanism 152, and a connecting member 154. Connecting member 154 is coupled with inspection tool assembly body 102 and probe body 146. Probe body 146 is received within an opening 156 that extends through a length 158 of connecting member 154. Biasing mechanism 152 is coupled to probe body 146 and probe tip 148, and biases probe tip 148 away from connecting member 154 along axis 150. When shroud segment 40 is in position with respect to inspection tool assembly 100 to facilitate inspection of at least one of first shroud segment length 98 and the second shroud segment length, biasing mechanism 152 biases probe tip 148 to contact at least one of racetrack side surface 79, either before or after machining, and snubber side surface 89. In one embodiment, biasing mechanism 152 is a spring. However, it should be understood that biasing mechanism 152 may be any biasing mechanism suitable for biasing probe tip 148 to contact at least one of racetrack side surface 79, either before or after machining, and snubber side surface 89.

To determine first shroud segment length 98 after racetrack side surface 79 has been machined, segment length probe 110 measures the location of probe tip 148 when probe tip 148 contacts machined racetrack side surface 79, and compares the location of probe tip 148 with a known location of snubber side surface 89. Alternatively, to determine first shroud segment length 98, segment length probe 110 measures the location of probe tip 148 when probe tip 148 contacts snubber side surface 89, and compares the location of probe tip 148 with a known location of machined racetrack side surface 79. To determine the second shroud segment length before racetrack side surface 79 has been machined, segment length probe 110 measures the location of probe tip 148 when probe tip 148 contacts unmachined racetrack side surface 79, and compares the location of probe tip 148 with a known location of snubber side surface 89. Alternatively, to determine the second shroud segment length, segment length probe 110 measures the location of probe tip 148 when probe tip 148 contacts snubber side surface 89, and compares the location of probe tip 148 with a known location of unmachined racetrack side surface 79.

Figure 7:
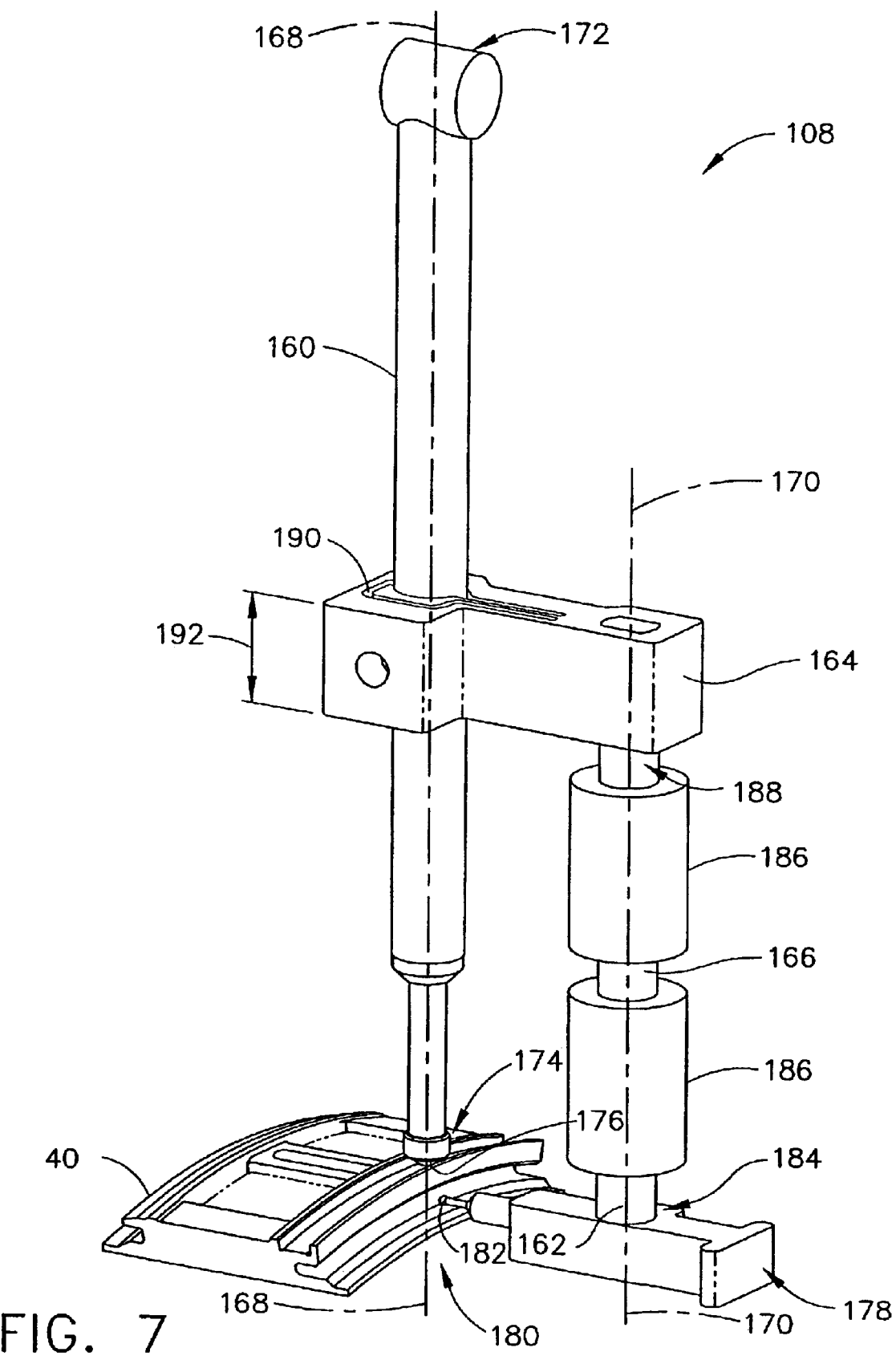
FIG. 7 is a perspective view of a snubber and racetrack probe for inspecting a component, such as the gas turbine engine shroud segment shown in FIGS. 2 and 3.

FIG. 7 is a perspective view of snubber and racetrack probe 108. Snubber and racetrack probe 108 is configured to inspect snubber thickness 90 and racetrack thickness 92. Snubber and racetrack probe 108 includes a first probe body 160, a second probe body 162, a connecting member 164, a shaft 166, a first probe body axis 168, and a shaft axis 170. First probe body axis 168 is generally parallel to shaft axis 170 and thus, first probe body 160 is generally parallel to shaft 166. First probe body 160 includes a first end 172, a second end 174, and a first probe body tip 176 on second end 174. Second probe body 162 includes a first end 178, a second end 180, and a second probe body tip 182 on second end 180. Second probe body 162 is coupled, using any suitable attachment, with shaft 166 at a first end 184 of shaft 166. Shaft 166 extends generally perpendicularly from second probe body 162 and includes a plurality of roller bearings 186 that are slidably coupled to shaft 166 and fixedly coupled to inspection tool assembly body 102. Shaft 166 is slidable within roller bearings 186 such that shaft 166 is translatable and selectively positionable along axis 170 and within roller bearings 186. Shaft 166 is coupled, using any suitable attachment, to connecting member 164 at a second end 188 of shaft 166.

Connecting member 164 extends from shaft second end 188 to first probe body 160 and is generally perpendicular to shaft 166. Connecting member 164 includes an opening 190 extending through a length 192 of connecting member 164. In the exemplary embodiment, opening 190 and first probe body 160 are cylindrically shaped. A portion of first probe body 160 is received within opening 190 and fixedly secured within opening 190, using any suitable means, for example threaded bolts and threaded nuts. In an alternative embodiment, probe body 160 is moveable within opening 190 such that probe body 160 is translatable and selectively positionable along axis 168 within opening 190. Probe tip 176 is moveable along axis 168 and within probe body 160. More specifically, probe tip 176 is translatable and selectively positionable along axis 168 within probe body 160. Although snubber and racetrack probe 108 is coupled to inspection tool assembly 100, first probe body 160 and connecting member 164 are translatable and selectively positionable along axis 168, and, in addition, shaft 166, connecting member 164, and second probe body 162 are translatable and selectively positionable along axis 170. Accordingly, first probe body 160, connecting member 164, shaft 166, and second probe body 162 are together translatable and selectively positionable with respect to inspection tool assembly body 102, and along both axes 168 and 170. Therefore, first probe body tip 176 and second probe body tip 182 are selectively positionable with respect to inspection tool assembly body 102 and each other.

Movement of first probe body 160 along axis 168 is driven by any suitable mechanism or means, including, but not limited to, a pneumatic system (not shown) coupled with first probe body 160, or a biasing mechanism. Furthermore, movement of first probe body tip 176 along axis 168 is driven by any suitable mechanism or means, including, but not limited to, a pneumatic system (not shown) coupled with first probe body tip 176, or a biasing mechanism. In addition, movement of connecting member 164, shaft 166, and second probe body 162 along axis 168 and axis 170 is driven by any suitable mechanism or means. For example, in one embodiment, movement of connecting member 164, shaft 166, and second probe body 162 along axis 168 and axis 170 is driven by a pneumatic system (not shown) coupled to at least one of connecting member 164, shaft 166, and second probe body 162. Alternatively, in another embodiment, movement of connecting member 164, shaft 166, and second probe body 162 along axis 168 and axis 170 is driven by a biasing mechanism.

When shroud segment 40 is in position with respect to inspection tool assembly 100 to facilitate inspection of at least one of snubber thickness 90 and racetrack thickness 92, second probe body tip 182 is positioned within either racetrack section passageway 54 or snubber section passageway 68, and first probe body 160 is positioned along axis 168 in a position with respect to shroud segment 40 facilitating contact between first probe body tip 176 and shroud segment 40. First probe body tip 176 is then moved toward shroud segment 40, along axis 168, and with respect to first probe body 160, until first probe body tip 176 contacts either groove bottom 82 or snubber section projection surface 88. Once first probe body tip 176 contacts either groove bottom 82 or snubber section projection surface 88, first probe body tip 176 remains in contact with either groove bottom 82 or snubber section projection surface 88 and remains fixed in position with respect to segment 40, fixture 101, and inspection tool assembly 100 during inspection of either snubber thickness 90 or racetrack thickness 92. First probe body 160, however, continues to move with respect to first probe body tip 176. Accordingly, first probe body 160 then moves along axis 168 away from first probe body tip 176 and shroud segment 40 such that connecting member 164, shaft 166, and second probe body 162 move along axes 168 and 170 away from fixture 101 until second probe body tip 182 contacts either first passageway outer wall 62 or second passageway outer wall 74. To determine snubber thickness 90, snubber and racetrack probe 108 measures the location of first probe body tip 176 when probe tip 176 is in contact with projection surface 88, and measures the location of second probe body tip 182 when probe tip 182 is in contact with outer wall 74. Snubber and racetrack probe 108 then compares the location of probe tip 176, with the location of probe tip 182, to determine snubber thickness 90. To determine racetrack thickness 92, snubber and racetrack probe 108 measures the location of first probe body tip 176 when probe tip 176 is in contact with groove bottom 82, and measures the location of second probe body tip 182 when probe tip 182 is in contact with first passageway outer wall 62. Snubber and racetrack probe 108 then compares the location of probe tip 176 with the location of probe tip 182 to determine racetrack thickness 92.

In operation, any of snubber thickness 90, racetrack thickness 92, first shroud segment thickness 94, second shroud segment thickness 96, first shroud segment length 98, or the second shroud segment length have been machined by the machining apparatus, inspection tool assembly 100 is orientated into a position with respect to fixture 101 and the machining apparatus to facilitate inspection of at least one of fixture 101, snubber thickness 90, racetrack thickness 92, first shroud segment thickness 94, second shroud segment thickness 96, first shroud segment length 98, and the second shroud segment length. Once positioned, inspection tool assembly 100 inspects at least one of fixture 101, snubber thickness 90, racetrack thickness 92, first shroud segment thickness 94, second shroud segment thickness 96, first shroud segment length 98, and the second shroud segment length using the appropriate probe 104, 106, 108, and/or 110. Inspection tool assembly 100 facilitates accurately, quickly, and repeatably measuring critical dimensions for a component, such as shroud segment 40. In one embodiment, each measurement, including orientating segment 40 for inspection and measuring, takes approximately 30 seconds. Furthermore, and in another embodiment, each measurement can be repeated by inspection tool assembly 100 within an accuracy of 0.0002 inches. In yet another embodiment, inspection tool assembly 100 inspects shroud segment 40 with an accuracy substantially similar to the accuracy of a CMM machine.

The above-described inspection tool is cost-effective, highly reliable, and highly accurate for inspecting a component. The tool facilitates accurate measurement of a thickness of the component with the use of only one probe. In addition, the tool permits a component, such as a gas turbine engine shroud segment, to be accurately inspected without removal from a machining apparatus. More specifically, because the inspection tool is coupled to at least one of a machining fixture and a machining apparatus, the machining apparatus can automatically perform orientation of the tool. Therefore, the tool requires minimal input from an operator and the cycle time is greatly reduced. Furthermore, the tool does not require extra floor space in a manufacturing area. As a result, the tool facilitates reducing inspection costs in a cost-effective and reliable manner.

Exemplary embodiments of tool assemblies are described above in detail. The systems are not limited to the specific embodiments described herein, but rather, components of each assembly may be utilized independently and separately from other components described herein. Each tool assembly component can also be used in combination with other tool assembly components.

While the invention has been described in terms of various specific embodiments, those skilled in the art will recognize that the invention can be practiced with modification within the spirit and scope of the claims.

What is claimed is:

1. An inspection tool comprising a shaft, a connecting member, a first probe having a probe body, a first probe tip coupled to said probe body, and a second probe tip coupled to said probe body, said first probe configured to inspect a component using said first and second probe tips, said shaft including at least one roller bearing slidably coupled to said shaft, said shaft coupled to said second probe tip and said connecting member, said first probe tip and said second probe tip selectively positionable with respect to each other.

2. An inspection tool in accordance with claim 1 wherein said first probe configured to measure a thickness of the component using said first and second probe tips.

3. An inspection tool in accordance with 1 further comprising a second probe configured to measure a length of the component.

4. An inspection tool in accordance with claim 1 further comprising a second probe configured to measure a location of a surface of a fixture used to fixedly secure the component in position during at least one of inspection and machining of the component.

5. An inspection tool in accordance with claim 1 wherein the component is a gas turbine engine shroud segment including a snubber section, said first probe tip configured to contact a first surface of the snubber section, said second probe tip configured to contact a second surface of the snubber section, said probe configured to determine a thickness of the snubber section using the locations of said first and second probe tips.

6. An inspection tool in accordance with claim 1 wherein the component is a gas turbine engine shroud segment including a racetrack section, said first probe tip configured to contact a first surface of the racetrack section, said second probe tip configured to contact a second surface of the racetrack section, said probe configured to determine a thickness of the racetrack section using the locations of said first and second probe tips.

7. An inspection tool in accordance with claim 1 wherein said inspection tool coupled to a fixture, the fixture configured to couple with the component such that the component is fixedly secured in position with respect to the fixture during machining of the component, said inspection tool configured to inspect the component while the component is coupled with the fixture.

8. An inspection tool in accordance with claim 1 wherein said inspection tool coupled to a machining apparatus used for machining the component, the machining apparatus comprises a fixture coupled thereto, the fixture configured to couple with the component such that the component is fixedly secured in position with respect to the fixture during machining of the component, said inspection tool configured to inspect the component while the component is coupled with the fixture.

* * * * *